(12) United States Patent
Tokita et al.

(10) Patent No.: US 8,227,114 B2
(45) Date of Patent: Jul. 24, 2012

(54) PREPARING METHOD OF NEGATIVE ACTIVE MATERIAL FOR NON-AQUEOUS ELECTROLYTE SECONDARY BATTERY AND NEGATIVE ACTIVE MATERIAL PREPARED THEREBY

(75) Inventors: Tetsuo Tokita, Minoh (JP); Hideaki Maeda, Minoh (JP); Naoya Kobayashi, Minoh (JP); Sung-Soo Kim, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 55 days.

(21) Appl. No.: 12/216,467

(22) Filed: Jul. 3, 2008

(65) Prior Publication Data

US 2009/0023070 A1    Jan. 22, 2009

(30) Foreign Application Priority Data

Jul. 5, 2007   (JP) ................................ 2007-177606
Jul. 2, 2008   (KR) ........................ 10-2008-0063918

(51) Int. Cl.
*H01M 4/13*   (2010.01)
*C01G 31/02*  (2006.01)

(52) U.S. Cl. ................. 429/231.2; 429/231.5; 29/623.1; 423/594.8

(58) Field of Classification Search .......... 429/122–347; 29/623.1; 423/594.8
See application file for complete search history.

(56) References Cited

U.S. PATENT DOCUMENTS

| 2005/0079417 A1* | 4/2005 | Kim et al. ................. 429/231.2 |
| 2006/0088766 A1 | 4/2006 | Kim et al. |
| 2007/0166615 A1* | 7/2007 | Takamuku et al. ........ 429/231.2 |
| 2008/0182171 A1* | 7/2008 | Maeda et al. .............. 429/231.5 |

FOREIGN PATENT DOCUMENTS

| CN | 1607687 A | 4/2005 |
| CN | 1783551 A | 6/2006 |
| EP | 01511101 | 3/2005 |
| JP | 2003-068305 | 3/2003 |

OTHER PUBLICATIONS

Sawada et al., Copending U.S. Appl. No. 12/606,926, filed Oct. 27, 2009.*
Korean Office Action issued by Korean Patent Office on Jun. 1, 2010 corresponding Korean Patent Application No. 10-2008-0063918 and Request for Entry of the Accompanying Office Action attached herewith.

(Continued)

*Primary Examiner* — Basia Ridley
*Assistant Examiner* — Jonathan G Leong
(74) *Attorney, Agent, or Firm* — Robert E. Bushnell, Esq.

(57) ABSTRACT

The method of preparing a negative active material for a non-aqueous electrolyte rechargeable battery includes mixing a vanadium compound and a lithium compound and then subjecting the mixture to first firing to obtain $Li_{1.0}(V_xM_y)_{1.0}O_2$ having a layered halite type structure (where $0.5 \leq x \leq 1.0$, $0 \leq y \leq 0.5$, $x+y=1$, and M is selected from the group consisting of group 2 to 15 elements of the periodic table and combinations thereof); and adding a lithium compound to the $Li_{1.0}(V_xM_y)_{1.0}O_2$ and then subjecting the resultant to second firing. The negative active material for a non-aqueous electrolyte rechargeable battery prepared according to the preparing method has high crystallinity, and excellent charge and discharge characteristics at a high rate.

11 Claims, 2 Drawing Sheets

OTHER PUBLICATIONS

Chinese Office Action issued by SIPO, dated May 25, 2011, corresponding to Chinese Patent Application No. 200810130544.4 together with Request for Entry.

Chinese Office Action issued by SIPO on Aug. 31, 2011 in connection with Chinese Patent Application No. 200810130544.4, which also claims Japanese Patent Application No. 2007-177606 and Korean Patent Application No. 10-2008-0063918 as its priority documents, with its attached English translation.

Chinese Certificate of Invention Patent issued by SIPO on May 9, 2012 in corresponding to Chinese Patent No. ZL 2008 1 0130544.4 and its English Translation attached herewith.

* cited by examiner

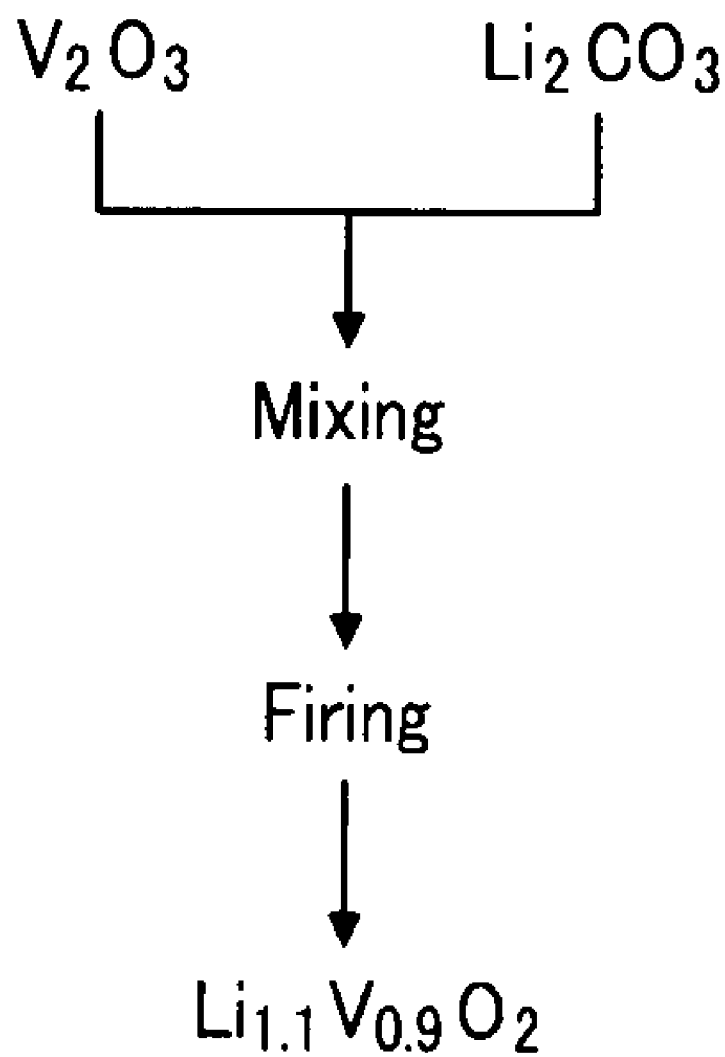

PREPARING METHOD OF NEGATIVE ACTIVE MATERIAL FOR NON-AQUEOUS ELECTROLYTE SECONDARY BATTERY AND NEGATIVE ACTIVE MATERIAL PREPARED THEREBY

CROSS-REFERENCE TO RELATED APPLICATIONS

This application claims priority to and the benefit of Japanese Patent Application No. 2007-177606 filed in the Japanese Patent Office on Jul. 5, 2007 and Korean Patent Application No. 10-2008-0063918, filed in the Korean Intellectual Property Office on Jul. 2, 2008, the entire contents of which are incorporated herein by reference.

BACKGROUND OF THE INVENTION (a) Field of the Invention

The present invention relates to a method of preparing a negative active material for a non-aqueous electrolyte rechargeable battery and a negative active material for a non-aqueous electrolyte rechargeable battery prepared thereby. More particularly, the present invention relates to a method of preparing a negative active material for a non-aqueous electrolyte rechargeable battery having high crystallinity, excellent charge and discharge characteristics at a high rate, and excellent charge and discharge cycle-life characteristics, and a negative active material for a non-aqueous electrolyte rechargeable battery prepared thereby.

(b) Description of the Related Art

As for a negative active material of a rechargeable lithium battery, various carbon-based materials such as artificial and natural graphite, hard carbon have been used, which can all intercalate and deintercalate lithium ions. In order to provide a high-capacity rechargeable battery, there have been efforts to improve utility of a carbon-based active material and charge density per electrode volume. However, capacity of the material is similar to a theoretical capacity (372 mAh/g) of graphite, and charge density improvement reaches a limit, and therefore it is difficult to provide a high-capacity battery using currently carbon materials.

Therefore, development of metal lithium or a silicon alloy material as a negative active material has been actively undertaken, but utilization of such materials is not yet implemented yet to large stress caused by electrode expansion and shrinkage.

Lithium vanadium oxide has been noted as a high-capacity material due to small stress caused by electrode expansion and shrinkage. However, this material occurs the change of oxide structure during charge and discharge, and shows a capacity decrease due to such structure degradation (Japanese Patent Laid-Open Publication No. 2003-68305).

SUMMARY OF THE INVENTION

According to one embodiment of the present invention, provided is a method of preparing a negative active material for a non-aqueous electrolyte rechargeable battery having high crystallinity, excellent charge and discharge characteristics at a high rate, and excellent charge and discharge cycle-life characteristics.

According to another embodiment of the present invention, provided is a negative active material for a non-aqueous electrolyte rechargeable battery prepared according to the above method.

According to a further embodiment of the present invention, provided is a negative electrode for a non-aqueous electrolyte rechargeable battery and a non-aqueous electrolyte rechargeable battery including the negative active material.

One embodiment of the present invention provides a method of preparing a negative active material for a non-aqueous electrolyte rechargeable battery that includes mixing a vanadium compound and a lithium compound and then subjecting the mixture to first firing to obtain $Li_{1.0}(V_xM_y)_{1.0}O_2$ having a layered halite type structure (where $0.5 \leq x \leq 1.0$, $0 \leq y \leq 0.5$, $x+y=1$, and M is selected from the group consisting of group 2 to 15 elements of the Periodic Table and combinations thereof), and adding a lithium compound to the $Li_{1.0}(V_xM_y)_{1.0}O_2$ and then subjecting the resultant to second firing.

As described above, the firing processes are performed twice, and thereby a negative active material for a non-aqueous electrolyte rechargeable battery having excellent charge and discharge characteristics at a high rate and excellent charge and discharge cycle-life characteristics can be provided. The first firing process provides stoichiometrically stable $Li_{1.0}(V_xM_y)_{1.0}O_2$ having an established layered halite type structure that has less vacant lattice defects where electrons do not occupy an upper site of a filled band at a solid energy band. In the second firing process, excess lithium ions are introduced into crystalline lattices to significantly improve crystallinity of lithium vanadium oxide, and provide high-capacity materials.

When y is 0 in the $Li_{1.0}(V_xM_y)_{1.0}O_2$, in the second firing process, a lithium compound and a compound including an element selected from the group consisting of group 2 to 15 elements of the periodic table and combinations thereof are added to $Li_{1.0}V_{1.0}O_2$, and then the mixture is fired.

The lithium compound may be a compound selected from the group consisting of lithium carbonate, lithium hydroxide, lithium nitrate, lithium sulfate, lithium sulfite, lithium acetate, lithium fluoride, lithium chloride, lithium bromide, lithium iodide, lithium acetate, lithium alkoxide, and mixtures thereof.

The element that is selected from the group 2 to 15 elements of the periodic table may be an element selected from the group consisting of Mg, Zr, Ti, Cr, Mn, Fe, Co, Ni, Nb, Mo, Ta, W, and combinations thereof.

The second firing process may be performed at 900° C. or more.

The negative active material for a non-aqueous electrolyte rechargeable battery according to another embodiment of the present invention is lithium vanadium oxide having a full width at half maximum of 0.20 degrees or less at a (003) plane measured by X-ray diffraction using CuKα.

The lithium vanadium oxide has a formula of $Li_aM_bV_cO_{2+d}$ wherein $0.1 \leq a \leq 2.5$, $0 \leq b \leq 0.5$, $0.5 \leq c \leq 1.5$, $0 \leq d \leq 0.5$, and M is selected from the group consisting of group 2 to 15 elements of the periodic table.

The negative active material has an intensity ratio of I(003)/I(104) ranging from 0.3 to 3 where I(003) is an X-ray diffraction peak intensity at a (003) plane and I(104) is an X-ray diffraction peak intensity at a (104) plane using CuKα.

The negative active material has an endothermic peak at 70 to 150° C., and preferably 70 to 110° C., while increasing the temperature under differential scanning calorimetry (DSC) measurement.

The negative active material has an endothermic peak of 10 to 100 J/g while increasing temperature under differential scanning calorimetry (DSC) measurement.

According to another embodiment of the present invention, provided is a negative electrode for a non-aqueous electrolyte rechargeable battery including the negative active material.

According to a further embodiment of the present invention, provided is a non-aqueous electrolyte rechargeable battery including the negative electrode.

The present invention provides a lithium vanadium oxide negative active material for a non-aqueous electrolyte rechargeable battery, having high crystallinity, excellent charge and discharge characteristics at a high rate, and excellent charge and discharge cycle-life characteristics.

The negative active material for a non-aqueous electrolyte rechargeable battery can provide a high-capacity rechargeable battery.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicated the same or similar components, wherein:

FIG. 2 is a flow chart of a method of preparing lithium vanadium oxide according to a conventional method.

DETAILED DESCRIPTION OF THE EMBODIMENTS

Figure 1:
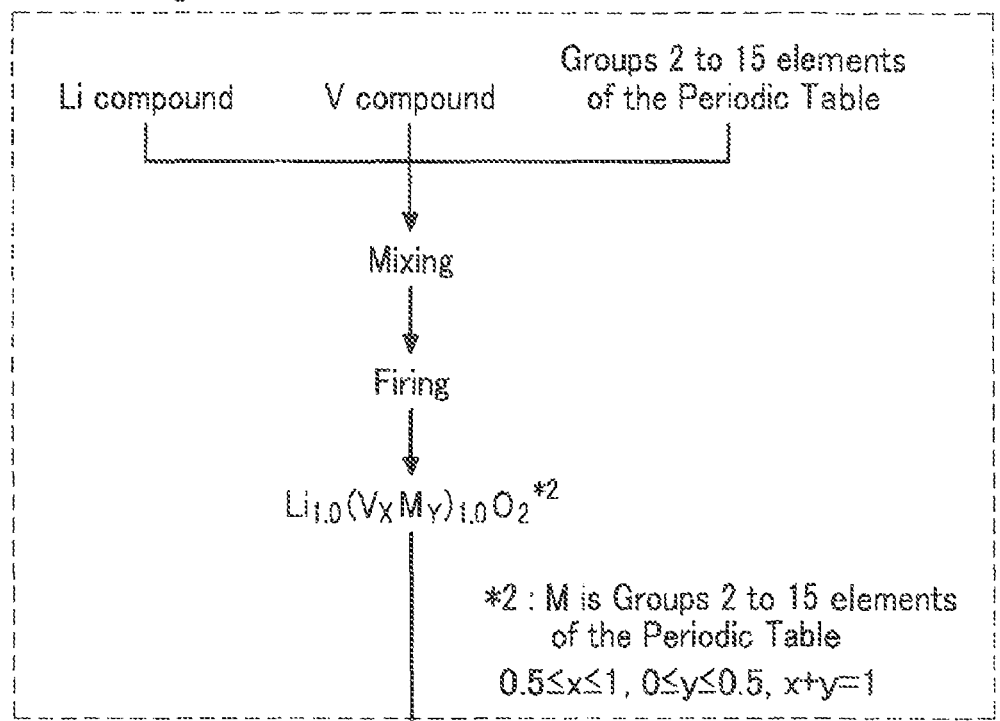
FIG. 1 is a flow chart of a method of preparing lithium vanadium oxide according to one embodiment of the present invention.
Figure 1:
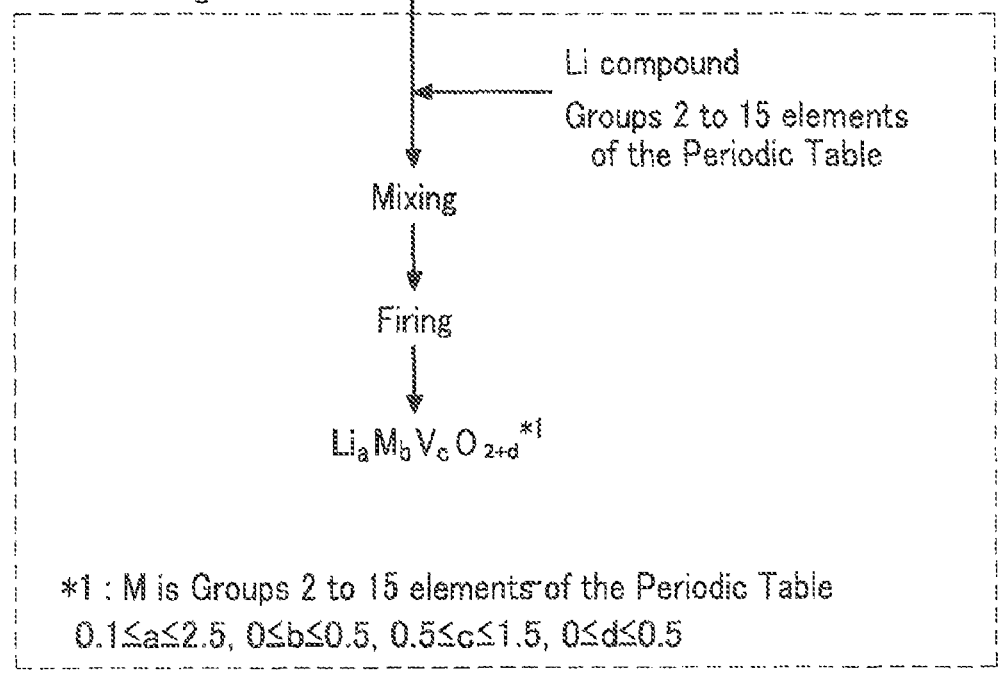

A non-aqueous electrolyte rechargeable battery according to one embodiment of the present invention will hereinafter be described in detail.

A rechargeable battery can be fabricated in a coin, button, sheet, cylinder, flat, and prism shape, and so on. The rechargeable battery includes a positive electrode, an electrolyte, a separator, and a negative electrode.

The positive electrode includes an active material, for example a composite oxide or composite sulfide including Li and transition elements such as Ti, Mo, W, Nb, V, Mn, Fe, Cr, Ni, Co, and so on, vanadium oxide, an organic conductive material such as a conjugated polymer, a chevrel-phase compound, and so on.

The electrolyte solution includes a non-aqueous electrolyte including a lithium salt dissolved in an organic solvent, a polymer electrolyte, an inorganic solid electrolyte, and a non-aqueous electrolyte including a composite material of a polymer electrolyte and an inorganic solid electrolyte.

Solvents of the non-aqueous electrolyte include linear ester series such as ethylene carbonate, propylene carbonate, dimethyl carbonate, diethyl carbonate, methylethyl carbonate, and so on; γ-lactone series such as γ-butyl lactone; linear ether series such as 1,2-dimethoxy ethane, 1,2-diethoxy ethane, ethoxymethoxy ethane, and so on; cyclic ether series such as tetrahydrofuran; and nitrile series such as acetonitrile.

The non-aqueous electrolyte includes a lithium salt solute such as $LiAsF_6$, $LiBF_4$, $LiPF_6$, $LiAlCl_4$, $LiClO_4$, $LiCF_3SO_3$, $LiSbF_6$, LiSCN, LiCl, $LiC_6H_5SO_3$, $LiN(CF_3SO_2)_2$, $LiC(CF_3SO_2)_3$, $LiC_4P_9SO_3$, and so on.

The separator may be a porous polymer film formed of polyolefin such as polypropylene or polyethylene, or a porous material of a glass filter, a non-woven fabric, and so on.

The negative electrode includes a negative active material powder including a lithium vanadium oxide-based material according to one embodiment of the present invention, and an additive such as a conductive agent, a binder, a filler, a dispersing agent, an ion conductive agent, a pressure enhancer, and so on.

The conductive agent includes graphite, carbon black, acetylene black, ketjen black, carbon fiber, a metal powder, and so on. The binder includes polytetrafluoro ethylene, poly vinylidene fluoride, polyethylene, and so on.

Other negative active materials may be used along with the various additives and lithium vanadium oxide-based negative active materials.

The above other negative active materials include carbon materials such as artificial graphite or natural graphite.

The negative active material according to one embodiment of the present invention and other negative active materials are combined, and thereby charge and discharge cycle characteristics or discharge characteristics at a high rate can be improved.

Then, the lithium vanadium oxide-based negative active materials and various additives are added to a solvent such as water or an organic solvent to prepare a slurry or a paste. The slurry or paste is applied on an electrode supporting substrate using a doctor blade and so on, and then dried and compressed to fabricate a negative electrode.

The electrode supporting substrate includes a thin film; a sheet or net formed of copper, nickel, stainless steel, and so on; or a sheet or net formed of carbon fiber.

Without using an electrode supporting substrate, the slurry or paste may be compressed in a pellet to provide a negative electrode.

The lithium vanadium oxide-based negative active material may be lithium vanadium oxide having a formula of $Li_aM_bV_cO_{2+d}$ wherein $0.1 \leq a \leq 2.5$, $0 \leq b \leq 0.5$, $0.5 \leq c \leq 1.5$, $0 \leq d \leq 0.5$, and M is selected from the group consisting of group 2 to 15 elements of the periodic table. In one embodiment, $a=1.1$, $b+c=0.9$, and $d=0$. The negative active material having the formula preferably has high crystallinity.

The lithium vanadium oxide-based negative active material may be obtained by the following exemplary process: in a first firing process, a vanadium compound and a lithium compound are mixed and then fired to obtain $Li_{1.0}(V_xM_y)_{1.0}O_2$ having a layered halite type structure, wherein $0.5 \leq x \leq 1.0$, $0 \leq y \leq 0.5$, $x+y=1$, and M is selected from the group consisting of group 2 to 15 elements of the periodic table; and then in a second firing process, a lithium compound is added to the obtained $Li_{1.0}(V_xM_y)_{1.0}O_2$ and then fired.

FIG. 1 is a flow chart showing a method of preparing lithium vanadium oxide as a negative active material for a non-aqueous electrolyte rechargeable battery according to one embodiment of the present invention. Referring to FIG. 1, the preparing method is described in more detail. A vanadium compound and a lithium compound are mixed and subjected to first firing to obtain $Li_{1.0}(V_xM_y)_{1.0}O_2$ having a layered halite type structure ($0.5 \leq x \leq 1.0$, $0 \leq y \leq 0.5$, $x+y=1$, and M is selected from the group consisting of group 2 to 15 elements of the periodic table), and a lithium compound is added to the $Li_{1.0}(V_xM_y)_{1.0}O_2$ and is subjected to second firing.

The vanadium (V) compound includes, but is not limited to: a vanadium oxide such as $V_2O_3$, $V_2O_5$, $V_2O_4$, $V_3O_4$, and so on; metallic vanadium; vanadium oxytrichloride; vanadium tetrachloride; vanadium trichloride; a metavanadate such as ammonium metavanadate, sodium metavanadate, and potassium metavanadate; polyvanadate; and so on.

The lithium (Li) compound includes, but is not limited to, lithium carbonate, lithium hydroxide, lithium nitrate, lithium sulfate, lithium sulfite, lithium acetate, lithium fluoride, lithium chloride, lithium bromide, lithium iodide, lithium acetate, lithium alkoxide, and so on.

The first firing process may be performed under an inert atmosphere or a reducing atmosphere. When the firing process is performed under an oxidation atmosphere, the obtained lithium vanadium oxide becomes a pentavalent vanadium oxide such as $LiVO_3$ or $Li_3VO_4$, which does not have a layered halite type structure and has low discharge capacity and charge and discharge efficiency.

The inert atmosphere includes an inert gas atmosphere such as Ar, $N_2$, and so on. As for the vanadium compound, a lower vanadium oxide such as $V_2O_3$, $V_2O_4$, $V_3O_4$, or metallic vanadium may be appropriate.

The reducing atmosphere includes a reducing gas atmosphere such as $H_2$, $SO_2$, and so on, and a mixed gas atmosphere of the above reducing gas and an inert gas. As for the vanadium compound, $V_2O_5$ or a pentavalent vanadium oxide such as vanadate may be appropriate.

The temperature of the first firing process is a temperature for producing lithium vanadium oxide having a layered halite type structure by reacting a vanadium compound and a lithium compound, but is not limited to a specific range. For example, the first firing process may be performed at 700 to 1500° C. The first firing time may be selected according to the firing temperature. For example the first firing process may be performed for 1 to 10 hours.

The lithium compound at the second firing process is the same as that at the first firing process.

At the second firing process, the lithium vanadium oxide having the layered halite type structure obtained at the first firing process does not have a group 2 to 15 element of the periodic table, and a group 2 to 15 element of the periodic table may be added to the lithium vanadium oxide along with the lithium compound and then fired. The group 2 to 5 element of the periodic table combined with the lithium vanadium oxide can provide a high-capacity material.

The group 2 to 15 elements of the periodic table include, but are not limited to, Mg, Zr, Ti, Cr, Mn, Fe, Co, Ni, Nb, Mo, Ta, W, and so on. The element may be added to the lithium vanadium oxide having a layered halite type structure in the form of an oxide, oxaloxide, hydroxide, carbonate, acetate, metalate, and so on.

The second firing process may be performed under an inert atmosphere or a reducing atmosphere. When the firing process is performed under an oxidation atmosphere, the obtained lithium vanadium oxide becomes a pentavalent vanadium oxide such as $LiVO_3$ or $Li_3VO_4$, which does not have a layered halite type structure and has low discharge capacity and charge and discharge efficiency. The inert atmosphere and the reducing atmosphere are the same as in the first firing process.

The second firing process is not limited to a specific range, but may be performed at 900° C. or more. When the firing temperature is 900° C. or more, the lithium compound or the compound including group 2 to 15 elements of the periodic table may be intercalated in a high crystalline state into the layered halite type structure of lithium vanadium oxide obtained in the first firing process. In one embodiment, the firing temperature may range from 900 to 1500° C. The second firing time may be selected according to the firing temperature. For example the second firing process may be performed for 1 to 10 hours.

FIG. 2 is a flow chart of a method of preparing lithium vanadium oxide according to a conventional method.

Referring to FIG. 2, since $Li_{1.1}V_{0.9}O_2$ is stoichiometrically unstable, when raw materials are simultaneously mixed and then fired to obtain $Li_{1.1}V_{0.9}O_2$, a crystalline material having vacant lattice defects in crystalline lattices crystal may be produced. During charge and discharge, lithium ions may be intercalated into the vacant lattice of the lithium vanadium oxide. The appropriately intercalated lithium may be combined with another atom to complement the vacant lattice, but inadvertently intercalated lithium ions may cause lattice defects. When the lattice defects are stabilized, balance between atom combinations may be changed, interlayer distance may be maintained at a uniform distance, or sites not being capable of intercalating and deintercalating lithium ions between a layered structure of lithium vanadium oxide due to electrical repulsion between lithium ions may be generated. As a result, battery capacity may be deteriorated.

In a preparation method according to one embodiment of the present invention, the firing processes are performed twice, where in the first firing process a stoichiometrically stable $Li_{1.0}V_{1.0}O_2$ having a layered halite type structure without no vacant lattice defects is established, and then in the second firing process excessive lithium ions are introduced to crystalline lattices. During charge and discharge, lithium ions are intercalated into crystalline defects, and as a result capacity reduction due to deactivation of lithium vanadium oxide can be inhibited.

The negative active material according to one embodiment of the present invention can be prepared by mixing a vanadium compound, a lithium compound, and selectively a compound including group 2 to 15 elements of the periodic table and then firing at a high temperature of 1150 to 1250° C.

The vanadium compound, lithium compound, and selectively the compound including group 2 to 15 elements of the periodic table are the same as described above.

The firing process can be performed under an inert atmosphere or a reducing atmosphere.

The lithium vanadium oxide-based negative active material prepared according to the above preparation method has a full width at half maximum of 0.20 degrees or less at a (003) plane measured by X-ray diffraction, indicating that it has significantly high crystallinity compared with the material prepared according to a conventional method.

The negative active material has an intensity ratio of I(003)/I(104) ranging from 0.3 to 3 where I(003) is an X-ray diffraction peak intensity at a (003) plane and I(104) is an X-ray diffraction peak intensity at a (104) plane. In one embodiment, the negative active material has an intensity ratio of I(003)/I(104) ranging from 0.5 to 2. When the intensity ratio of I(003)/I(104) is within the above range, an ideal layered compound can be obtained, whereas when the intensity ratio is out of the range, a layered structure may not be obtained.

The full width at half maximum at the (003) plane and X-ray diffraction peak intensity are measured using a CuKα X-ray (50 kV/300 mA) at a 2θ range of 10 to 90°. The scanning rate is 0.02°/second exposure.

The negative active material has an endothermic peak at 70 to 150° C. while increasing the temperature with differential scanning calorimetry (DSC) measurement. In one embodiment, the negative active material has an endothermic peak at 70 to 110° C. while increasing the temperature with differential scanning calorimetry (DSC) measurement. The negative active material shows endothermic peaks within the temperature range, resulting in excellent safety.

Furthermore, the negative active material has an endothermic peak at 70 to 110° C. that allows absorption of heat generated by decomposing an SEI (solid electrolyte interface) layer that is produced by reacting the negative active material and an electrolyte during charging and discharging, at low temperatures, thereby preventing a thermal runaway phenomenon so that the safety of the battery may be improved.

The negative active material has an endothermic peak of 10 to 100 J/g while increasing the temperature with differential scanning calorimetry (DSC) measurement. In one embodiment, the negative active material has an endothermic peak of 10 to 60 J/g while increasing the temperature with differential scanning calorimetry (DSC) measurement. The negative active material having endothermic peaks area within the temperature range can absorb heat at initial thermal runaway, thereby improving thermal safety.

The endothermic peaks found by differential scanning calorimetry (DSC) are measured while increasing the temperature of the negative active material by charging and discharging the battery using the negative active material of the present invention and drying it under argon gas (30 ml/min) by increasing at a rate of 10° C./min to obtain a DSC temperature increase curved line, and then obtaining endothermic the peak temperatures therefrom.

The following examples illustrate the present invention in more detail. However, the examples are only exemplary and do not limit the present invention.

Example 1

A lithium vanadium oxide with a layered halite type structure as a frame was prepared by mixing $Li_2CO_3$ and $V_2O_3$ in a mole ratio of 1.0:1.0 and then firing the mixture at 1100° C. for 5 hours under a nitrogen gas atmosphere.

Next, the lithium vanadium oxide with a layered halite type structure was mixed with $Li_2CO_3$ in a mole ratio of 0.9:0.1 and then fired under a nitrogen gas atmosphere at 1100° C. for 5 hours, acquiring a lithium vanadium oxide ($Li_{1.1}V_{0.9}O_2$).

The lithium vanadium oxide as a negative active material was XRD-measured under the following conditions, acquiring full width at half maximum at the (003) plane and a peak intensity ratio of the (003) and (104) planes. The results are shown in Table 1 to follow.

XRD measurement equipment: Rigaku Rint 2000 (Rigaku Co.)
Vacuum tube: CuKα1
Voltage: 50 kV
Current: 300 mA
Scanning range: 10-90°
Measurement method: Fourier transformation
Scanning step: 0.02°
Measurement time: 1.2 sec Then, 48 wt % of the lithium vanadium oxide ($Li_{1.1}V_{0.9}O_2$) was mixed with 42 wt % of graphite powder and 10 wt % of poly vinylidene fluoride to fabricate a negative electrode, and a positive electrode was also fabricated by using 91 wt % of $LiCoO_2$, 3 wt % of acetylene black, and 6 wt % of poly vinylidene fluoride. These electrodes were disposed at both sides of a separator and wound together. The electrode assembly was put in a battery can and welded. Then, an electrolyte solution of 1M $LiPF_6$ EC/DEC (3:7) was injected into the battery can. It was settled for 1 hour and sealed, completing a battery. This battery was charged with constant current (0.5 C)-constant voltage (4.2V), and then discharged with 0.2 C and 2 C up to 2.75V as a discharge cut-off voltage. In addition, it was charged for 200 cycles with constant current (0.5 C)-constant voltage (4.2V), and then discharged with 0.5 C up to 2.75V as a discharge cut-off voltage. The results are shown in Table 2 to follow.

Example 2

A lithium vanadium oxide with a layered halite type structure as a frame was prepared by mixing $Li_2CO_3$ and $V_2O_3$ in a mole ratio of 1.0:1.0, and then fired under a nitrogen gas atmosphere at 1100° C. for 5 hours. The lithium vanadium oxide with a layered halite type structure was mixed with $Li_2CO_3$ and $MgC_2O_4.2H_2O$ with a mole ratio of 0.87:0.1:0.03 and then fired at 1100° C. for 5 hours under a nitrogen gas atmosphere, acquiring a lithium vanadium oxide ($Li_{1.1}Mg_{0.03}V_{0.87}O_2$). Then, a battery was fabricated according to the same method as in Example 1 except for using the lithium vanadium oxide ($Li_{1.1}Mg_{0.03}V_{0.87}O_2$) as a negative active material.

Example 3

$Li_2CO_3$ was mixed with $V_2O_3$ in a mole ratio of 1.0:1.0 and then fired at 1100° C. for 5 hours under a nitrogen gas atmosphere, acquiring a lithium vanadium oxide with a layered halite type structure as a frame. Next, the lithium vanadium oxide with a layered halite type structure was mixed with $Li_2CO_3$ and $ZrO_2$ in a mole ratio of 0.87:0.1:0.03 and then fired at 1100° C. for 5 hours under nitrogen gas atmosphere, acquiring a lithium vanadium oxide ($Li_{1.1}Zr_{0.03}V_{0.87}O_2$). Then, a battery was fabricated according to the same method as in Example 1 except for using the lithium vanadium oxide ($Li_{1.1}Zr_{0.03}V_{0.87}O_2$) as a negative active material.

Example 4

$Li_2CO_3$ was mixed with $V_2O_3$ in a mole ratio of 1.0:1.0 and then fired at 1100° C. for 5 hours under a nitrogen gas atmosphere, preparing a lithium vanadium oxide with a layered halite type structure. The lithium vanadium oxide with a layered halite type structure was mixed with $Li_2CO_3$ and $TiO_2$ in a mole ratio of 0.87:0.1:0.03 and then fired at 1100° C. for 5 hours under a nitrogen gas atmosphere, acquiring a lithium vanadium oxide ($Li_{1.1}Ti_{0.03}V_{0.87}O_2$). Then, a battery was fabricated according to the same method as in Example 1 except for using the lithium vanadium oxide ($Li_{1.1}Ti_{0.03}V_{0.87}O_2$) as a negative active material.

Example 5

$Li_2CO_3$ was mixed with $V_2O_3$ in a mole ratio of 1.0:1.0 and then fired at 1100° C. for 5 hours under a nitrogen gas atmosphere, preparing a lithium vanadium oxide with a layered halite type structure. Next, the lithium vanadium oxide with a layered halite type structure was mixed with $Li_2CO_3$ in a mole ratio of 0.9:0.1 and then fired at 1000° C. for 5 hours under a nitrogen gas atmosphere, preparing a lithium vanadium oxide ($Li_{1.1}V_{0.9}O_2$). Then, a battery was fabricated according to the same method as in Example 1 except for using the lithium vanadium oxide ($Li_{1.1}V_{0.9}O_2$) as a negative active material.

Example 6

$Li_2CO_3$ was mixed with $V_2O_3$ in a mole ratio of 1.0:1.0 and then fired at 1100° C. for 5 hours under a nitrogen gas atmosphere, preparing a lithium vanadium oxide with a layered halite type structure. Next, the lithium vanadium oxide was mixed with $Li_2CO_3$ in a mole ratio of 0.9:0.1 and then fired at 900° C. for 5 hours under a nitrogen gas atmosphere, preparing a lithium vanadium oxide ($Li_{1.1}V_{0.9}O_2$). Then, a battery was fabricated according to the same method as in Example 1 except for using the lithium vanadium oxide ($Li_{1.1}V_{0.9}O_2$) as a negative active material.

Comparative Example 1

$Li_2CO_3$ was mixed with $V_2O_3$ in a mole ratio of 1.1:0.9 and then fired at 1100° C. for 5 hours, preparing a lithium vanadium oxide ($Li_{1.1}V_{0.9}O_2$). The lithium vanadium oxide ($Li_{1.1}V_{0.9}O_2$) was used as a negative active material to fabricate a battery according to the same method as in Example 1.

Example 7

$Li_2CO_3$ was mixed with $MgC_2O_4 \cdot 2H_2O$ and $V_2O_3$ in a mole ratio of 1.0:0.1:0.9 and then fired at 1100° C. for 5 hours under a nitrogen gas atmosphere, preparing a lithium vanadium oxide with a layered halite type structure. The lithium vanadium oxide was mixed with $Li_2CO_3$ in a mole ratio of 0.9:0.1 and then fired at 1100° C. for 5 hours, preparing a lithium vanadium oxide ($Li_{1.1}Mg_{0.09}V_{0.81}O_2$). The lithium vanadium oxide ($Li_{1.1}Mg_{0.09}V_{0.81}O_2$) was used as a negative active material to fabricate a battery according to the same method as in Example 1.

Example 8

A lithium vanadium oxide with a layered halite type structure as a frame was prepared by mixing $Li_2CO_3$, $ZrO_2$, and $V_2O_3$ in a mole ratio of 1.0:0.1:0.9, and then being fired at 1100° C. for 5 hours under a nitrogen gas atmosphere. The lithium vanadium oxide was mixed with $Li_2CO_3$ in a mole ratio of 0.9:0.1 and then fired at 1000° C. for 5 hours, preparing a lithium vanadium oxide ($Li_{1.1}Zr_{0.09}V_{0.81}O_2$). The lithium vanadium oxide ($Li_{1.1}Zr_{0.09}V_{0.81}O_2$) was used as a negative active material to fabricate a battery according to the same method as in Example 1.

Example 9

A lithium vanadium oxide with a layered halite type structure was prepared by mixing $Li_2CO_3$, $TiO_2$, and $V_2O_3$ in a mole ratio of 1.0:0.1:0.9, and then being fired at 1100° C. for 5 hours under a nitrogen gas atmosphere. The lithium vanadium oxide was mixed with $Li_2CO_3$ in a mole ratio of 0.9:0.1 and then being fired at 1100° C. for 5 hours under a nitrogen gas atmosphere, preparing a lithium vanadium oxide ($Li_{1.1}Ti_{0.09}V_{0.81}O_2$). The lithium vanadium oxide ($Li_{1.1}Ti_{0.09}V_{0.81}O_2$) was used as a negative active material to fabricate a battery according to the same method as in Example 1.

Example 10

A lithium vanadium oxide ($Li_{1.1}Mg_{0.09}V_{0.81}O_2$) was prepared by mixing $Li_2CO_3$, $MgC_2O_4 \cdot 2H_2O$, and $V_2O_3$ in a mole ratio of 1.1:0.09:0.81, and then being fired at 1150° C. for 5 hours under a nitrogen gas atmosphere. The lithium vanadium oxide ($Li_{1.1}Mg_{0.09}V_{0.81}O_2$) was used as a negative active material to fabricate a battery according to the same method as in Example 1.

Comparative Example 2

A lithium vanadium oxide ($Li_{1.1}Mg_{0.09}V_{0.81}O_2$) was prepared by mixing $Li_2CO_3$, $MgC_2O_4 \cdot 2H_2O$, and $V_2O_3$ in a mole ratio of 1.1:0.09:0.81, and then being fired at 1100° C. for 5 hours under a nitrogen gas atmosphere. The lithium vanadium oxide ($Li_{1.1}Mg_{0.09}V_{0.81}O_2$) was used as a negative active material to fabricate a battery according to the same method as in Example 1.

Comparative Example 3

A lithium vanadium oxide ($Li_{1.1}Zr_{0.09}V_{0.81}O_2$) was prepared by mixing $Li_2CO_3$, $ZrO_2$, and $V_2O_3$ in a mole ratio of 1.1:0.09:0.81, and then being fired at 1100° C. for 5 hours under a nitrogen gas atmosphere. The lithium vanadium oxide ($Li_{1.1}Zr_{0.09}V_{0.81}O_2$) was used as a negative active material to fabricate a battery according to the same method as in Example 1.

Comparative Example 4

A lithium vanadium oxide ($Li_{1.1}Ti_{0.09}V_{0.81}O_2$) was prepared by mixing $Li_2CO_3$, $TiO_2$, and $V_2O_3$ in a mole ratio of 1.1:0.09:0.81, and then being fired at 1100° C. for 5 hours under a nitrogen gas atmosphere. The lithium vanadium oxide ($Li_{1.1}Ti_{0.09}V_{0.81}O_2$) was used as a negative active material to fabricate a battery according to the same method as in Example 1.

The lithium vanadium oxide negative active materials of Examples 1 to 9 and Comparative Example 4 were XRD measured under the following conditions to acquire a full width at half maximum at a (003) plane and a peak intensity ratio of the (003) and (104) planes. The results are shown in the following Table 1.

XRD measurement equipment: Rigaku Rint2000 (Rigaku Co.)
Vacuum tube: CuKα1
Voltage: 50 kV
Current: 300 mA
Scanning range: 10-90°
Measurement method: Fourier transformation
Scanning step: 0.02°
Measurement time: 1.2 sec In addition, the lithium vanadium oxide negative active materials of Examples 1 to 10 and Comparative Example 4 were examined regarding endothermic peak and peak area in a differential scanning calorimetry (DSC) method. The results are shown in the following Table 1.

The endothermic peak was measured by heating the negative active materials by 10° C./min under argon gas (30 ml/min), and checking a DSC temperature graph.

TABLE 1

|  | XRD full width at half maximum (°) | Peak intensity ratio of the (003) and (104) planes | Endothermic peak temperature (° C.) | Endothermic peak area (J/g) |
|---|---|---|---|---|
| Example 1 | 0.15 | 1.5 | 125 | 50 |
| Example 2 | 0.10 | 1.52 | 120 | 40 |
| Example 3 | 0.13 | 1.5 | 125 | 45 |
| Example 4 | 0.14 | 1.5 | 125 | 50 |
| Example 5 | 0.18 | 1.6 | 128 | 60 |
| Example 6 | 0.20 | 2 | 130 | 40 |
| Example 7 | 0.09 | 1.52 | 120 | 40 |
| Example 8 | 0.11 | 1.5 | 120 | 40 |
| Example 9 | 0.12 | 1.5 | 120 | 40 |
| Example 10 | 0.11 | 1.5 | 120 | 40 |
| Comparative Example 1 | 0.22 | 3.5 | 160 | 150 |
| Comparative Example 2 | 0.24 | 4.0 | 170 | 160 |
| Comparative Example 3 | 0.24 | 4.0 | 170 | 160 |
| Comparative Example 4 | 0.24 | 4.0 | 170 | 160 |

As shown in Table 1, the lithium vanadium oxides with a full width at half maximum at a (003) plane of less than 0.20 and accordingly with high crystallinity were prepared by separating a lithium compound into two doses, and adding them twice and performing firing twice.

Then, the batteries of Examples 1 to 10 and Comparative Examples 1 to 4 were charged with constant current (0.5 C)-constant voltage (4.2V) and discharged with 0.2 C and 2 C up to 2.75V as a discharge cut-off voltage. In addition, they were charged with constant current (0.5 C)-constant voltage (4.2V) for 200 cycles and discharged with 0.5 C up to 2.75V as a discharge cut-off voltage. The results are shown in the following Table 2.

TABLE 2

|  | 2 C/0.2 C (%) | Cycle life (%) |
| --- | --- | --- |
| Example 1 | 105*1 | 105*2 |
| Example 2 | 107*1 | 108*2 |
| Example 3 | 108*1 | 110*2 |
| Example 4 | 106*1 | 109*2 |
| Example 5 | 104*1 | 103*1 |
| Example 6 | 101*1 | 101*2 |
| Example 7 | 110*3 | 115*4 |
| Example 8 | 112*5 | 113*6 |
| Example 9 | 114*7 | 112*8 |
| Example 10 | 112*5 | 113*6 |

In Table 2, main signs are denoted as follows.
*1 a ratio relative to 100% of 2 C/0.2 C discharge efficiency characteristic of Comparative Example 1
*2 a ratio relative to 100% of cycle life characteristic of Comparative Example 1
*3 a ratio relative to 100% of 2 C/0.2 C discharge efficiency characteristic of Comparative Example 2
*4 a ratio relative to 100% of cycle life characteristic of Comparative Example 2
*5 a ratio relative to 100% of 2 C/0.2 C discharge efficiency characteristic of Comparative Example 3
*6 a ratio relative to 100% of cycle life characteristic of Comparative Example 3
*7 a ratio relative to 100% of 2 C/0.2 C discharge efficiency characteristic of Comparative Example 4
*8 a ratio relative to 100% of cycle life characteristic of Comparative Example 4

As shown in Table 2, the lithium vanadium oxides turned out to have excellent discharge efficiency and cycle life characteristics by adding a lithium compound twice during the firing rather than adding it once.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A negative active material for a non-aqueous electrolyte rechargeable battery comprising lithium vanadium oxide having a full width at a half maximum of 0.09 to 0.11 degrees at a (003) plane measured by X-ray diffraction, wherein the lithium vanadium oxide has a formula of $Li_aM_bV_cO_{2+d}$ wherein $1.0 \leq a \leq 1.1$, $0 \leq b \leq 0.5$, $0.5 \leq c \leq 1.0$, $0 \leq d \leq 0.5$, b+c=1, and M is an element selected from the group consisting of Mg, Zr, Ti, Cr, Mn, Fe, Co, Ni, Nb, Ta, and combinations thereof
prepared by mixing a vanadium compound and a lithium compound subjected to a first firing to obtain $Li_{1.0}(V_xM_y)_{1.0}O_2$ having a layered halite type structure (where $0.5 \leq x \leq 1.0$, $0 \leq y \leq 0.5$, x+y=1, and M is an element selected from the group consisting of Mg, Zr, Ti, Cr, Mn, Fe, Co, Ni, Nb, Ta, and combinations thereof); and
adding a lithium compound to the $Li_{1.0}(V_xM_y)_{1.0}O_2$ and then subjecting the resultant to second firing.

2. The negative active material of claim 1, wherein when y is 0 in the $Li_{1.0}(V_xM_y)_{1.0}O_2$, the second firing process comprises adding a lithium compound and a compound including an element selected from the group consisting of group 2 to 15 elements of the periodic table and combinations to $Li_{1.0}V_{1.0}O_2$ and firing the resultant.

3. The negative active material of claim 1, wherein the lithium compound is selected from the group consisting of lithium carbonate, lithium hydroxide, lithium nitrate, lithium sulfate, lithium sulfite, lithium acetate, lithium fluoride, lithium chloride, lithium bromide, lithium iodide, lithium alkoxide, and mixtures thereof.

4. The negative active material of claim 1, wherein the second firing process is performed at 900° C. or more.

5. The negative active material of claim 1, wherein the negative active material has an intensity ratio of I(003)/I(104) ranging from 0.3 to 3 where I(003) is an X-ray diffraction peak intensity at a (003) plane and I(104) is an X-ray diffraction peak intensity at a (104) plane.

6. The negative active material of claim 1, wherein the negative active material has an endothermic peak at 70 to 150° C. while increasing the temperature under differential scanning calorimetry (DSC) measurement.

7. The negative active material of claim 1, wherein the negative active material has an endothermic peak of 10 to 100 J/g while increasing the temperature under differential scanning calorimetry (DSC) measurement.

8. A non-aqueous electrolyte rechargeable battery comprising a negative electrode comprising a negative active material comprising lithium vanadium oxide having a full width at a half maximum of 0.09 to 0.11 degrees at a (003) plane measured by X-ray diffraction, wherein the lithium vanadium oxide has a formula of $Li_aM_bV_cO_{2+d}$ wherein $1.0 \leq a \leq 1.1$, $0 \leq b \leq 0.5$, $0.5 \leq c \leq 1.0$, $0 \leq d \leq 0.5$, b+c=1, and M is an element selected from the group consisting of Mg, Zr, Ti, Cr, Mn, Fe, Co, Ni, Nb, Ta, and combinations thereof
prepared by mixing a vanadium compound and a lithium compound subjected to a first firing to obtain $Li_{1.0}(V_xM_y)_{1.0}O_2$ having a layered halite type structure (where $0.5 \leq x \leq 1.0$, $0 \leq y \leq 0.5$, x+y=1, and M is an element selected from the group consisting of Mg, Zr, Ti, Cr, Mn, Fe, Co, Ni, Nb, Ta, and combinations thereof); and
adding a lithium compound to the $Li_{1.0}(V_xM_y)_{1.0}O_2$ and then subjecting the resultant to second firing.

9. The non-aqueous electrolyte rechargeable battery of claim 8, wherein the negative active material has an intensity ratio of I(003)/I(104) ranging from 0.3 to 3 where I(003) is an X-ray diffraction peak intensity at a (003) plane and I(104) is an X-ray diffraction peak intensity at a (104) plane.

10. The non-aqueous electrolyte rechargeable battery of claim 8, wherein the negative active material has an endothermic peak at 70 to 150° C. while increasing the temperature under differential scanning calorimetry (DSC) measurement.

11. The non-aqueous electrolyte rechargeable battery of claim 8, wherein the negative active material has an endothermic peak of 10 to 100 J/g while increasing the temperature under differential scanning calorimetry (DSC) measurement.

* * * * *